United States Patent
Sprague et al.

(10) Patent No.: US 7,636,101 B2
(45) Date of Patent: Dec. 22, 2009

(54) MEMS SCANNER ADAPTED TO A LASER PRINTER

(75) Inventors: Randall B. Sprague, Carnation, WA (US); Wyatt O. Davis, Bothell, WA (US); Dean R. Brown, Lynnwood, WA (US); Yoshiro Koga, Shiojiri (JP); Nobumasa Abe, Matsumoto (JP); Yujiro Nomura, Shiojiri (JP)

(73) Assignee: Microvision, Inc., Redmond, WA (US)

( * ) Notice: Subject to any disclaimer, the term of this patent is extended or adjusted under 35 U.S.C. 154(b) by 137 days.

(21) Appl. No.: 11/502,131

(22) Filed: Aug. 9, 2006

(65) Prior Publication Data

US 2007/0109560 A1    May 17, 2007

(30) Foreign Application Priority Data

Feb. 9, 2005    (WO)    ............... PCT/US2005/004066

(51) Int. Cl.
  *B41J 15/14*    (2006.01)
  *B41J 27/00*    (2006.01)
(52) U.S. Cl. ........................ 347/243; 347/259
(58) Field of Classification Search ................. 347/239, 347/255, 231, 243, 259, 260, 241, 256; 359/224, 359/17, 213.1, 214.1, 202.2; 345/32
See application file for complete search history.

(56) References Cited

U.S. PATENT DOCUMENTS

| | | | |
|---|---|---|---|
| 4,530,138 A | 7/1985 | Ritter | |
| 5,543,956 A | 8/1996 | Nakagawa et al. | |
| 5,861,979 A | 1/1999 | Ji et al. | |
| 5,912,608 A | 6/1999 | Asada | |
| 5,969,465 A | 10/1999 | Neukermans et al. | |
| 5,982,528 A | 11/1999 | Melville et al. | |
| 6,049,407 A | 4/2000 | Melville et al. | |
| 6,107,115 A | 8/2000 | Atobe et al. | |
| 6,128,122 A * | 10/2000 | Drake et al. | ................. 359/224 |
| 6,198,565 B1 | 3/2001 | Iseki et al. | |
| 6,243,186 B1 | 6/2001 | Melville | |

(Continued)

FOREIGN PATENT DOCUMENTS

EP    0620415    10/1994

(Continued)

OTHER PUBLICATIONS

International Search Report for PCT/US2005/004066 dated Jun. 1, 2005.

(Continued)

*Primary Examiner*—Hai C Pham
(74) *Attorney, Agent, or Firm*—Kevin D. Wills

(57) ABSTRACT

An electrophotographic printer includes an exposure unit having a MEMS scanner operable to scan a beam of light across a photoconductor. The MEMS scanner includes a mirror having an aspect ratio similar to the shape of the facets of a conventional rotating polygon scanner. In a preferred embodiment, the scan mirror has a length of about 750 microns in a dimension parallel to its axis of rotation and a length of about 8 millimeters in a dimension perpendicular to its axis of rotation. The MEMS scanner is operable to scan at a frequency of about 5 KHz and an angular displacement of about 20 degrees zero-to-peak mechanical scan angle.

36 Claims, 8 Drawing Sheets

U.S. PATENT DOCUMENTS

| | | | |
|---|---|---|---|
| 6,245,590 B1 | 6/2001 | Wine et al. | |
| 6,259,548 B1 | 7/2001 | Tsugai et al. | |
| 6,285,485 B1 | 9/2001 | Ferriera | |
| 6,360,035 B1 | 3/2002 | Hurst, Jr. et al. | |
| 6,392,220 B1 | 5/2002 | Slater et al. | |
| 6,449,079 B1 | 9/2002 | Herrmann | |
| 6,463,085 B1 | 10/2002 | Tayebati | |
| 6,672,732 B1 | 1/2004 | Niendorf et al. | |
| 6,760,145 B1 | 7/2004 | Taylor et al. | |
| 6,769,616 B2 | 8/2004 | Fu et al. | |
| 6,912,078 B2 | 6/2005 | Kudrle et al. | |
| 6,963,679 B1 | 11/2005 | Novotny et al. | |
| 6,965,177 B2 | 11/2005 | Turner et al. | |
| 6,999,215 B2 | 2/2006 | Dewa et al. | |
| 7,050,211 B2 | 5/2006 | Orcutt | |
| 7,053,520 B2 | 5/2006 | Zetti et al. | |
| 7,067,344 B1 | 6/2006 | Oguchi | |
| 7,123,396 B2 * | 10/2006 | Nomura et al. | 359/224 |
| 7,324,751 B2 | 1/2008 | Khalfallah et al. | |
| 7,482,730 B2 * | 1/2009 | Davis et al. | 310/311 |
| 2001/0048784 A1 | 12/2001 | Behin et al. | |
| 2001/0052834 A1 | 12/2001 | Asada | |
| 2002/0011759 A1 | 1/2002 | Adams et al. | |
| 2002/0044276 A1 | 4/2002 | Stoner et al. | |
| 2002/0122217 A1 | 9/2002 | Nakajima | |
| 2002/0125325 A1 | 9/2002 | Plesko | |
| 2002/0149294 A1 | 10/2002 | Matsumoto et al. | |
| 2002/0171901 A1 | 11/2002 | Bernstein | |
| 2003/0016428 A1 | 1/2003 | Kato et al. | |
| 2003/0032215 A1 | 2/2003 | Ives | |
| 2003/0053186 A1 | 3/2003 | Arima | |
| 2003/0072066 A1 | 4/2003 | Hayashi et al. | |
| 2003/0122066 A1 | 7/2003 | Dunfield | |
| 2003/0137711 A1 | 7/2003 | Yagi et al. | |
| 2003/0169055 A1 | 9/2003 | Klement | |
| 2003/0209073 A1 | 11/2003 | Carroll et al. | |
| 2003/0214460 A1 * | 11/2003 | Kovacs | 345/32 |
| 2003/0223679 A1 | 12/2003 | Mala et al. | |
| 2004/0007069 A1 | 1/2004 | Turner et al. | |
| 2004/0008400 A1 | 1/2004 | Hill et al. | |
| 2004/0060898 A1 | 4/2004 | Tsai | |
| 2004/0105139 A1 | 6/2004 | Hirose et al. | |
| 2004/0218155 A1 | 11/2004 | Schenk et al. | |
| 2004/0232107 A1 | 11/2004 | Kouma et al. | |
| 2005/0018322 A1 | 1/2005 | Ben-Gad et al. | |
| 2005/0045727 A1 | 3/2005 | Y-Chung | |
| 2005/0179976 A1 * | 8/2005 | Davis et al. | 359/224 |
| 2005/0243396 A1 * | 11/2005 | Fujii et al. | 359/224 |
| 2007/0211469 A1 | 9/2007 | Hewlett | |

FOREIGN PATENT DOCUMENTS

| | | |
|---|---|---|
| EP | 0692729 | 1/1996 |
| EP | 1197779 | 4/2002 |
| EP | 1275997 | 1/2003 |
| EP | 1338912 | 8/2003 |
| EP | 1338912 A1 * | 8/2003 |
| EP | 1553752 | 7/2005 |
| JP | 09197334 | 7/1997 |
| JP | 2000-214407 | 8/2000 |
| JP | 2004-069731 | 3/2004 |
| WO | WO 01/46741 | 6/2001 |
| WO | WO 03/062899 | 7/2003 |

OTHER PUBLICATIONS

Nobuakai, Asai et al., "A Novel High Resolution Optical Scanner Actuated by Aerosol Deposited PZT Films", IEEE pp. 247-250, Nagoya, Japan, 2003 2003 , 247-250.

Schenk, Harald et al., "A Resonantly Excited 2D-Micro-Scanning-Mirror with Large Deflection", *Sensors and Actuators*, A 89 2001 , 104-111.

Office Action from U.S. Appl. No 10/984,327, mailed on Apr. 4, 2008.

* cited by examiner

MEMS SCANNER ADAPTED TO A LASER PRINTER

CROSS REFERENCES TO RELATED APPLICATIONS

This application claims benefit from the U.S. Provisional Patent Application Ser. No. 60/542,896, entitled MEMS SYSTEM ADAPTED TO A LASER PRINTER, invented by Wyatt O. Davis et al., applied for on 9 Feb. 2004.

This application relates to material in the co-pending U.S. Patent Applications entitled HIGH PERFORMANCE MEMS SCANNER, invented by Wyatt O. Davis et al., application Ser. No. 10/986,640, applied for on 12 Nov. 2004; METHOD AND APPARATUS FOR MAKING A MEMS SCANNER, invented by Kelly D. Linden et al., application Ser. No. 10/986,635, applied for on 12 Nov. 2004; and METHOD AND APPARATUS FOR SCANNING A BEAM OF LIGHT, invented by Gregory T. Gibson et al., application Ser. No. 10/988,155, applied for on 12 Nov. 2004.

FIELD OF THE DISCLOSURE

The present invention relates to microelectromechanical system (MEMS) scanners and particularly to their application to laser printers.

BACKGROUND

Electrophotographic, computer controlled printers have become pervasive in the office, factory, print shop, copy center, and home. An electrophotographic printer operates by transferring toner to plain paper and fusing the toner by means of heat, pressure, and/or other fixing technologies. The pattern of the transferred toner may form characters, graphic images, etc.

The term electrophotography refers to the use of modulated light, frequently a scanned laser beam, to create an electrostatic latent image on a photoconductive carrying medium such as a drum or belt. The latent electrostatic image is formed by momentary electrical conductivity of the photoconductor in response to exposure to the modulated light. The momentary conductivity allows a surface charge to discharge through the photoconductor to a conductor held at a bias voltage at locations corresponding to the modulated light exposure.

FIG. 1 is a diagram illustrating the principal features of an electrophotographic printer. A photoconductive drum 102 is rotated past a charging or sensitization station 104 that deposits a static charge substantially uniformly over the surface of the drum 102. An imaging module 106 modulates light selectively over the surface of the photoconductor 102. This causes the static charge in those spots receiving light to discharge through the photoconductive layer to a conductive layer on the backside of the photoconductor surface. The pattern of discharged and non-discharged spots is referred to as a latent electrostatic image or latent image.

Electrophotographic printers may be made to write-white or write-black. In a write-black system, the toner charge is selected to be attracted to the photoconductor backside conductive layer bias voltage and repelled from the sensitization static charge deposited on the photoconductor surface. Thus, the spots "written" by the modulated light correspond to black areas of the printed page.

Once the electrostatic latent image is formed, the photoconductor 102 is further rotated to a developer 108, where oppositely charged toner, most often in the form of fine, dry particles, is attracted to and deposited on the surface of the photoconductor in a pattern corresponding to the latent image. The photoconductor 102 is further rotated to a transfer point, where the patterned toner is then transferred to the paper 112, often using an electrostatic attraction element 110 such as a corona wire in the form of a corotron or scorotron.

The paper 112, with toner loosely adhered thereto, is fed forward through a fusing station 114 that, generally through a combination of heat and pressure, causes the thermoplastic toner particles to permanently adhere to the paper, thus forming a robust image.

Following transfer of the toner, the photoconductive medium 102 is rotated past a discharge lamp 116 and a cleaner 118, and then repeats the process as it is rotated to the sensitizer or charger 104.

In various printers, light emitting diode (LED), liquid crystal shutter (LCS), vacuum fluorescent, and other types of arrayed light modulator write heads have been used for modulating light onto the photoconductor. Generally though, scanned laser beam exposure or imaging modules have gained favor in the art due to an appropriate balance of cost, speed, performance, and durability. An electrophotographic printer that uses a scanned laser beam to provide light modulation onto the surface of the photoconductive medium may be conveniently referred to as a laser beam printer or LBP.

FIG. 2 illustrates the general construction of an LBP exposure unit 106 made according to the prior art with a rotating polygon beam scanner. A laser diode 202 having a wavelength matched to the sensitivity of the photoconductor (often infrared in the case of an organic photoconductor) is modulated with an image signal. Beam-forming optics 204 produce a laser beam having a desired shape and trajectory. The laser beam is reflected off a rotating polygon mirror 206 and is scanned across the photoconductor 102 through optical elements 208. It may be noted that the design of the exposure module 106 is such that the reflective facets 210a, 210b, etc. of the rotating polygon 206 are placed forward of the center of rotation such that the arriving beam sweeps over each mirror surface as it is deflected across its deflection angle, the deflection angle being sufficient to traverse the photoconductor 102.

One difficulty encountered with scanned laser beam exposure modules relates to the technology used to scan the laser beam. Most frequently, rotating polygon mirrors have been used. Rotating polygon mirrors may suffer from relatively large mass, slow ramp-up to speed, large size, noise, bearing reliability issues, relatively high power consumption, and other shortcomings.

Overview

Various aspects according to the disclosure relate to microelectromechanical system (MEMS) scanners and the use of a MEMS laser beam scanner in an electrophotographic printer exposure unit. Such an approach can result in reduced mass and size, faster start-up, reduced noise, higher reliability, and other advantages, compared to rotating polygon exposure units.

According to several aspects of the invention, a MEMS laser beam scanner may be formed with various physical and operational attributes; including mirror size, scan angle, scan frequency, and mirror flatness; to be especially well-adapted to an electrophotographic printer exposure unit. A MEMS mirror with extended length transverse the scanning axis can be substituted for a rotating polygon without substantial modifications to the exposure module optical design.

Other aspects will become apparent to the reader through reference to the appended brief description of the drawings, detailed description, claims, and figures.

DETAILED DESCRIPTION

Figure 1:
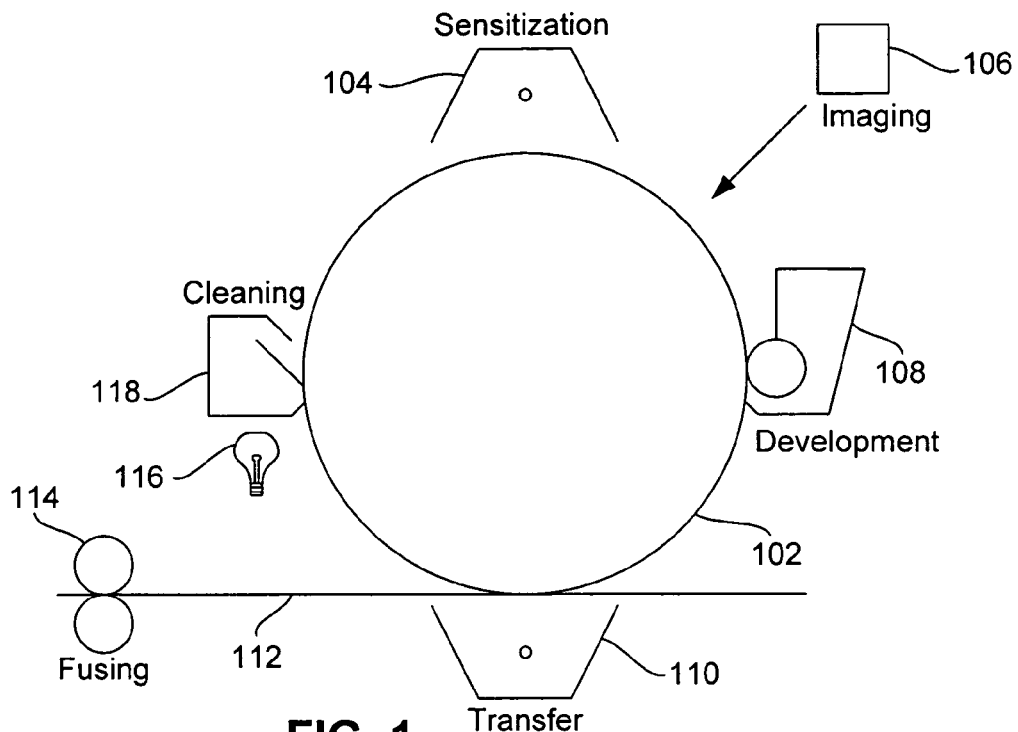
FIG. 1 is a diagram illustrating the principal components of a typical electrophotographic printer.
Figure 2:
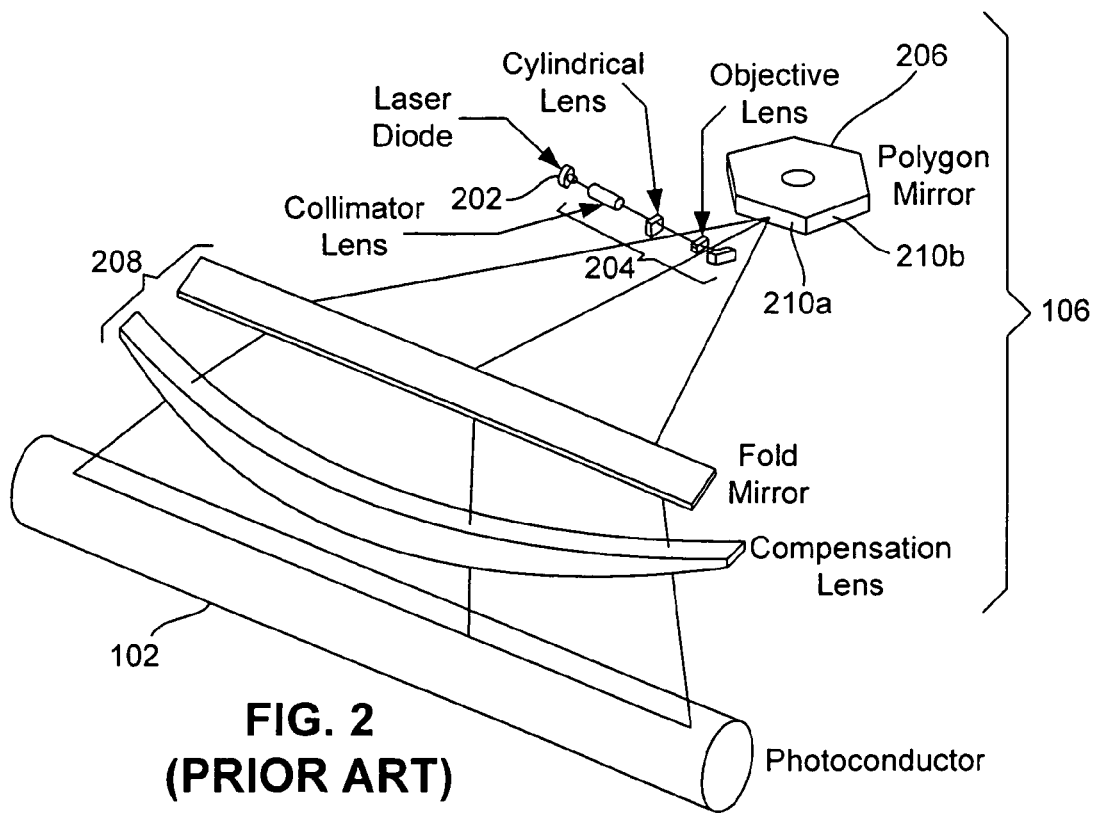
FIG. 2 is a diagrammatic view of a LBP exposure unit with a rotating polygon scanner made according to the prior art.
Figure 3:
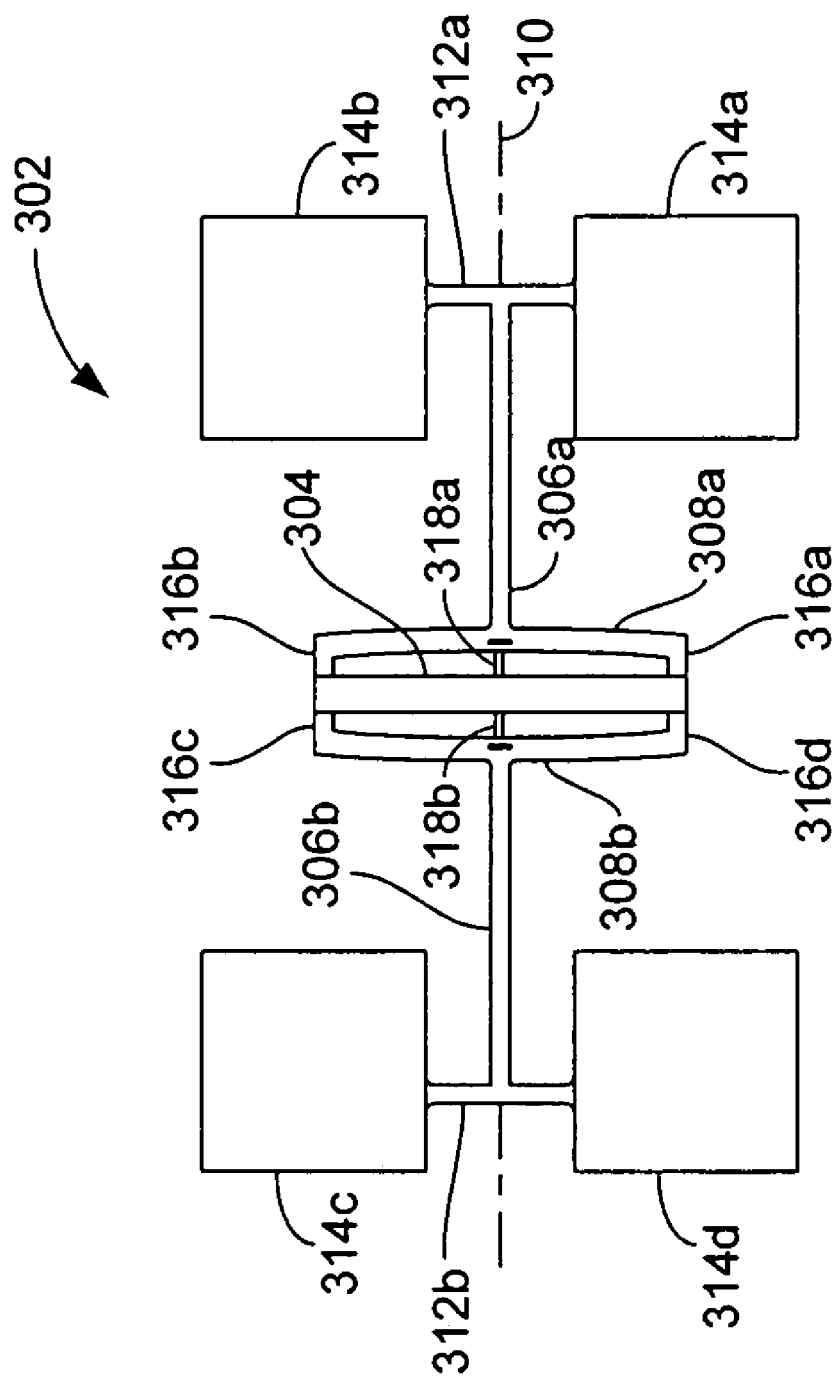
FIG. 3 is a view of a MEMS scanner made according to an embodiment of the present invention.

FIG. 3 illustrates a MEMS scanner 302 that may be used in a LBP. The exemplary embodiment shown herein relates to a 40 page per minute (ppm), 1200 dot per inch (dpi) LBP. MEMS scanner 302 is photolithographically formed from single-crystal silicon using bulk micromachining as is known to the art. A scan plate 304 having a mirror surface is coupled to a pair of torsion arms 306a, 306b through respective suspension beams 308a, 308b. Torsion arms 306a, 306b define a rotational axis 310 about which scan plate 304 and suspension beams 308a, 308b rotate. Suspension beams 308a and 308b help to keep the mirror surface relatively flat, typically within lambda/4, by spreading the torque loads induced by the torsion arms 306a, 306b across the surface of the scan plate 304.

Suspension beams 308 are coupled to scan plate 304 by respective outer (lateral) connectors 316a, 316b, 316c, 316d and respective axial connectors 318a, 318b. Taken together, suspension elements 308a, 316a, 316b, and 318a form a first suspension coupling between first torsion arm 306a and scan plate 304. Similarly suspension elements 308b, 316c, 316d, and 318b form a second suspension coupling between second torsion arm 306b and scan plate 304.

A mirror surface can be formed on the surface of scan plate 304 using metal, stacked dielectric, or other technologies known to the art. Aluminum can be used to form a mirror having greater than about 85% reflectivity at red and infrared wavelengths (having a local minimum at about 825 nanometers wavelength). Gold or silver can be used to form a mirror having greater than about 90% to 95% reflectivity at red and infrared wavelengths. Stacked (such as quarter-wave) dielectric reflectors can achieve very high reflectivity across a wide range of wavelengths.

Torsion arms 306a, 306b terminate at respective "T-bars" 312a and 312b. T-bars 312a and 312b, in turn connect to respective mounting pads 314a, 314b and 314c, 314d as illustrated. Taken together, T-bar 312a and mounting pads 314a, 314b constitute a first mounting structure for coupling torsion arm 306a to a support structure (not shown). Similarly, T-bar 312b and mounting pads 314c, 314d form a second mounting structure for coupling torsion arm 306b to a support structure (not shown). In alternative embodiments, mounting structures can take other forms, including for example a pair of rectangular mounting pads, each joined directly to a respective torsion arm, or other forms. Alternatively, a frame-type mounting structure may be formed peripheral to the scan plate 304 and torsion arms 306a, 306b. The exemplary embodiment of FIG. 3 may have certain advantages such as, for example, packing more devices per wafer, having reduced dynamic stress, allowing individual mounting pads to be coupled to actuators, and allowing the mounting pads 314 to "float" relative to one another, thereby reducing residual stresses in the MEMS scanner.

When mounting pads 314a, 314b, 314c, and 314d are mounted to a housing, periodic application of power to an actuator (not shown) will cause mirror 304 to periodically rotate back and forth about the axis of rotation 310 defined by torsion arms 306a, 306b.

Scan plate 304 is formed to be approximately 8 millimeters long (in the direction perpendicular to the axis of rotation 310) and 750 micrometers wide (in the direction parallel to the axis of rotation 310). Thus, for the exemplary embodiment, the scan plate (and mirror formed thereon) has a lateral dimension about 10.67 times its longitudinal dimension.

When driven with an appropriate signal, (such as a 5 kilohertz (KHz) sine wave varying between about 0 (zero) and 25-30 volts for a four actuator design) the mirror responds with a ±20° mechanical scan angle at a frequency of 5 KHz.

As illustrated, MEMS scanner 302 includes two torsion arms 306a, 306b, each 8.76 millimeters long (including fillets), terminated on their proximal ends by a 400 micron by 200 micron elliptical fillet at respective suspensions (in particular at suspension beams 308a, 308b), and terminated on their distal ends at respective T-bars 312a, 312b, again with a 400 micron by 200 micron elliptical fillet. The torsion arms 306a, 306b are 384 microns wide. As with the rest of MEMS scanner 302, the torsion arms are etched to a full wafer thickness of 700 microns using DRIE processing. For a given scan plate mass and mass distribution, the width, depth, and length of the torsion arms and T-bars may be adjusted to produce alternative resonant scan frequencies and angles.

The suspension beams 308a, 308b are 396 microns wide, are slightly bent to make a slightly obtuse angle with respective torsion arms 306a, 306b of 91.6 degrees, and extend laterally to an extent equal to the lateral extent of the 8 millimeter lateral dimension scan plate 304. Respective suspension center connectors 318a, 318b extend from the centerlines of suspension beams 308a, 308b to the centerline of the scan plate 304, a distance of 500 microns (including fillets). The center connectors 318a, 318b are each 164 microns wide and include 100 micron radius fillets at both ends. Four suspension outer connectors 316a, 316b, 316c, and 316d extend from the ends of suspension beams 308a, 308b to the scan plate 304, one on each end of each suspension beam as indicated. The outer connectors 316a, 316b, 316c, 316d are each 250 microns wide (laterally) by 400 microns long (longitudinally) and do not have fillets. The respective suspensions thus each include a suspension beam 308, a center suspension connector 318, and two outer suspension connectors 316; and connect the torsion arms 306a, 306b to the scan plate 304 in a manner that reduces stress concentrations, spreads the torque load, and reduces dynamic deformation of the scan plate during operation. Alternative suspension configurations are possible and could be implemented by one skilled in the art.

The T-bars 312a, 312b are each 1.8 millimeters long (total lateral dimension inclusive of fillets) by 400 microns wide (longitudinal dimension) and extend symmetrically from and perpendicular to the axis formed by torsion arms 306a, 306b. The outer ends of T-bars 312a, 312b connect to four respective mounting pads 314a, 314b, 314c, 314d with 200 micron radius fillets as shown. The mounting pads are each 5 millimeters square. The geometry of the T-bars and mounting pads may be adjusted to suit application requirements.

Figure 4:
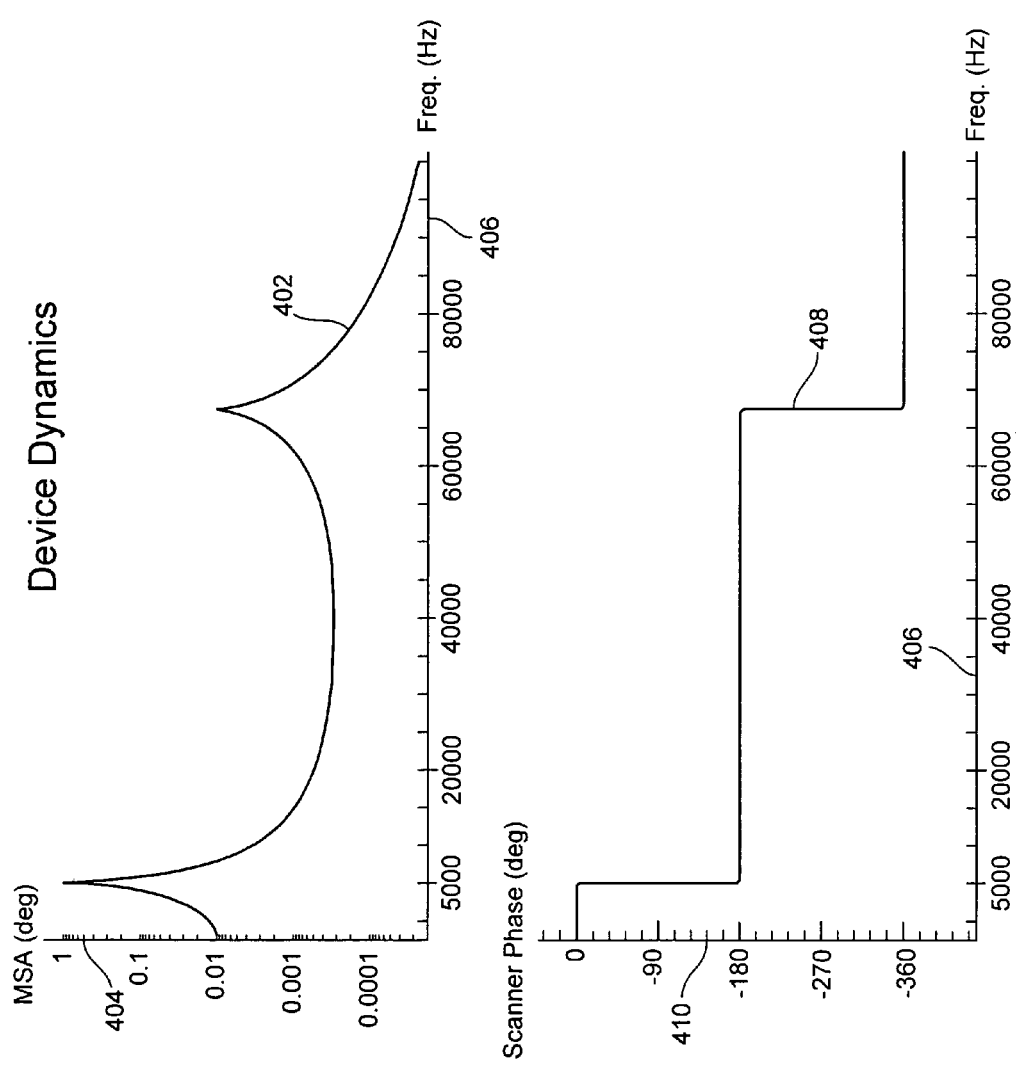
FIG. 4 is a graph illustrating the dynamic response of the MEMS scanner of FIG. 3.

FIG. 4 shows graphs illustrating the dynamic response of the MEMS scanner of FIG. 3 when a periodic drive signal is applied. Curve 402 indicates an amplitude response 404 as a function of periodic drive frequency 406. Curve 408 illustrates scanner vs. drive phase 410 plotted against the same periodic drive frequency axis 406. From inspection of curve 402, one can see a peak in response at about 5 KHz corresponding to the resonance frequency of the MEMS scanner in the rotation mode. While the size of the peak is plotted on a relative basis, it is, for the exemplary embodiment, sufficiently high to produce a resonance response of ±20° mechanical scan angle at acceptable drive power. For a four-actuator embodiment, a drive waveform approximating a 5 KHz sine wave with amplitude of 0 (zero) to 25-30 volts results in ±20° mechanical scan angle.

The secondary peak at between 65 and 70 KHz corresponds to the resonant behavior of the piezo-electric stack actuators.

Curve 408 illustrates how the phase relationship of the drive signal to the MEMS scanner response inverts at the resonance points. Below 5 KHz, the phase relationship (drive to response) is 0°. Above 5 KHz but below the secondary peak, the phase relationship is −180°. At the primary resonant peak, the phase relationship inverts and passes through −90° (response lagging drive) as indicated. Above the secondary peak, the response of the system drops and the phase response again inverts, passing from −180° below the peak, through −270°(+90°) at the secondary resonance peak, to −360° (0°) at frequencies above the secondary resonance peak. To maximize efficiency, it has been found to be advantageous to operate the MEMS scanner at or very near the primary resonance peak.

For operation at 5 KHz, the resonance frequency of the MEMS scanner is trimmed to be a few hertz above 5 KHz, typically in the range of 5.001 to 5.005 KHz. Such trimming may be accomplished using methods described in U.S. Pat. No. 6,245,590, hereby incorporated by reference. It has been found to be advantageous to factory trim resonant frequency using a method of adding weight, in the form of epoxy applied to the scan plate.

Figure 5:
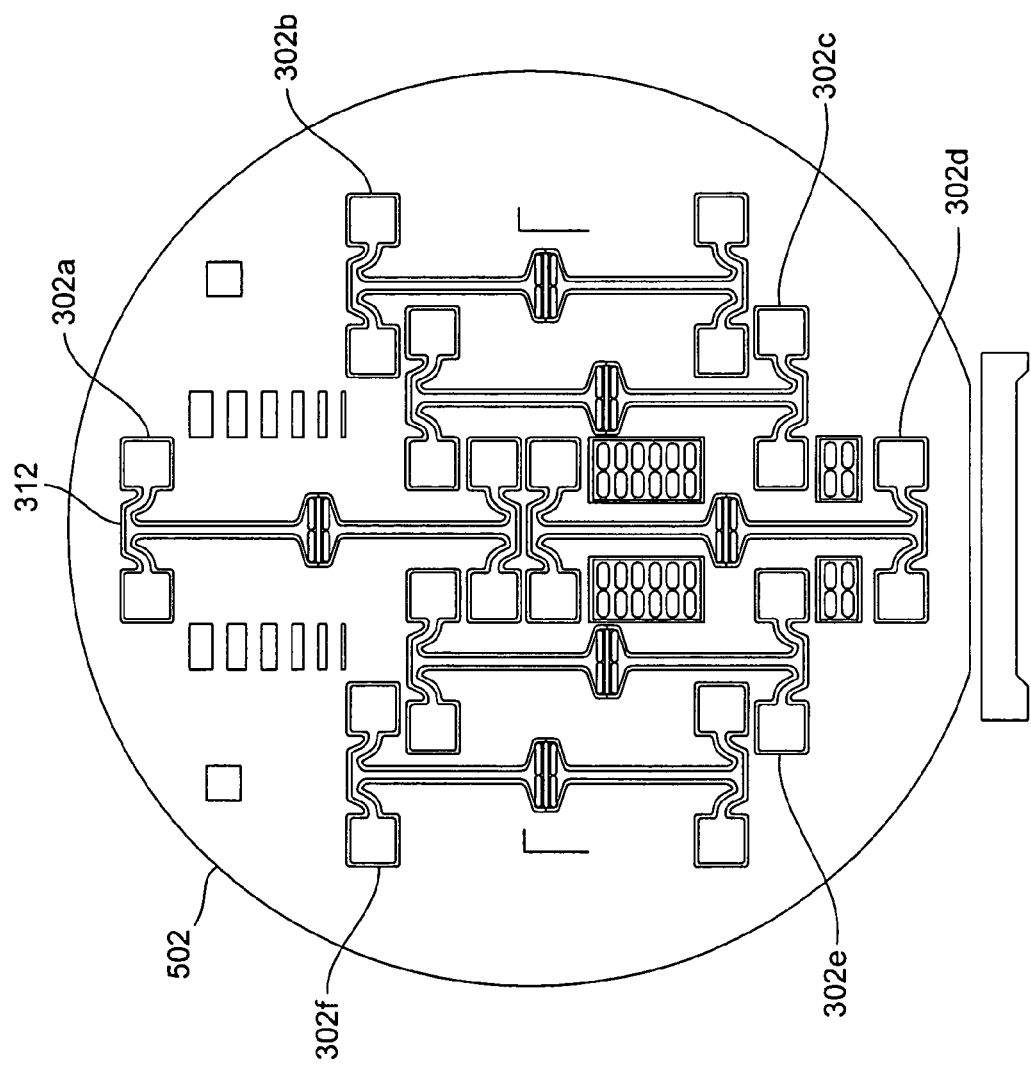
FIG. 5 is a view of a number of MEMS devices of FIG. 3 showing how they can be arrayed on a silicon wafer during manufacture.

FIG. 5 illustrates a prototypical layout of MEMS scanners 302a, 302b, 302c, 302d, 302e, and 302f on a 100 millimeter silicon wafer 502. As may be seen, the MEMS scanners are densely packed with interdigitated mounting pads and mirrors. This is done to maximize yield per wafer. Larger wafers would be similarly densely packed with devices. Rather than dicing the devices apart using a dicing saw, a photolithographic step such as deep reactive ion etch (DRIE) is used to almost completely release the scanners from the wafer. Very fine silicon "bridges" may be seen connecting the scanners to the wafer at intervals. To release the scanners, these bridges are simply broken and the scanners popped out.

FIG. 5 further illustrates an alternate T-bar 312 design wherein the ends of the "T" are offset toward the scan plate. This can result in shorter part length or better interdigitation of neighboring parts on the wafer, and may be useful for minimizing scanner size, maximizing yield from the wafer, etc.

Figure 6:
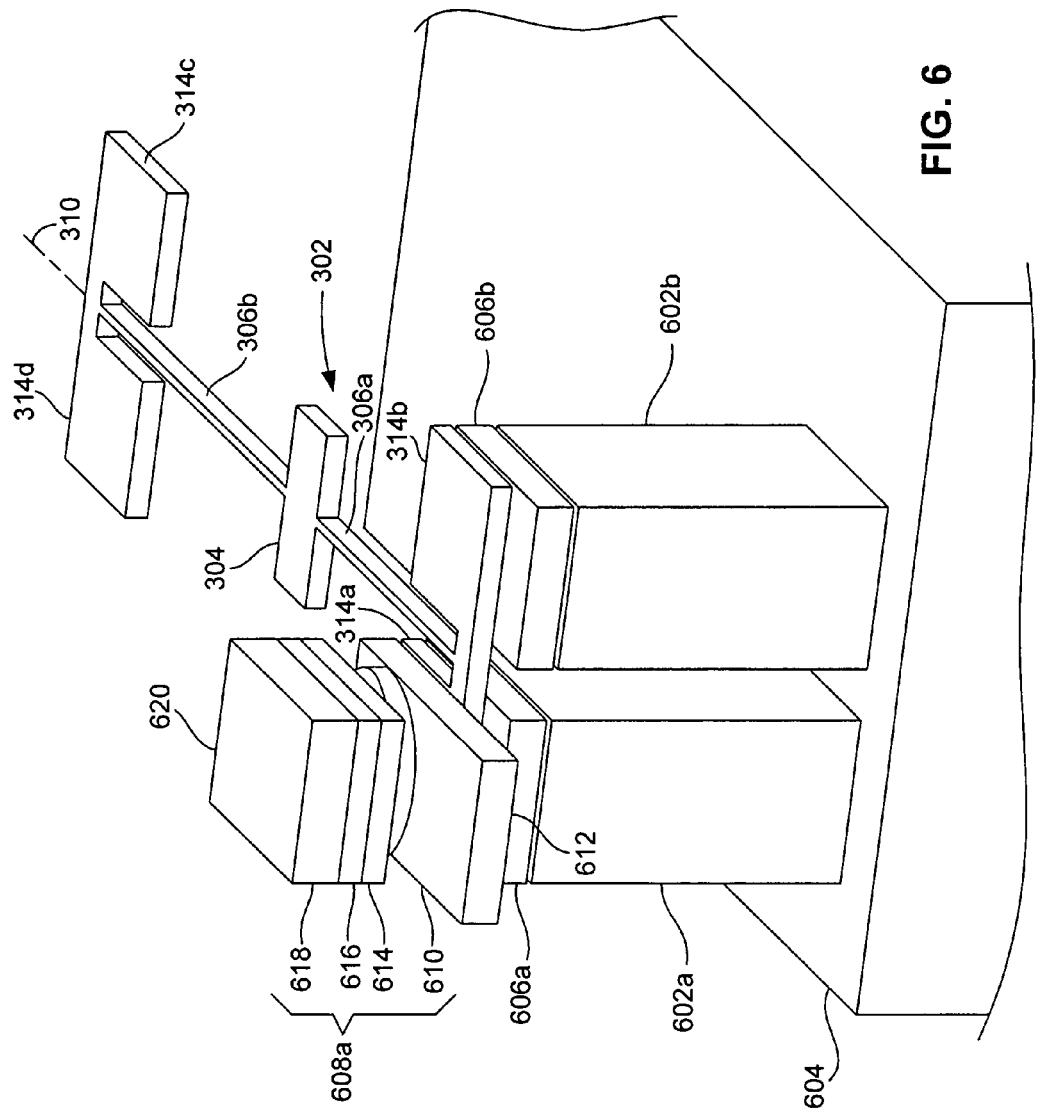
FIG. 6 is a view of a mounting clamp for mounting the MEMS scanner of FIG. 3.

FIG. 6 illustrates a clamp and actuator arrangement for the MEMS scanner. A pair of commercially-available piezo-electric stacks 602a and 602b, set upon a common mounting base 604, support respective mounting pads 314a, 314b of MEMS scanner 302 through respective first insulators 606a, 606b. From their respective positions, the piezo-electric stacks 602a, 602b may be alternately electrically compressed and expanded to produce a periodic rotation of the mounting pads 314a, 314b about the axis of rotation 310 defined by torsion arms 306a, 306b. Similarly, common mode activation of the piezo-electric stacks 602a, 602b may be used to rotate the MEMS scanner 302 about a transverse axis substantially parallel to the long axis of the mirror 304.

To maintain contact between the MEMS scanner 302 and the piezo-electric actuator stacks 602a, 602b, respective clamps or pressure assemblies 608a and 608b (608b not shown) press the mounting pads 314a, 314b down against the actuator stacks. Clamp 608b is omitted from FIG. 6 for clarity. As shown, clamps 608 include (starting from the bottom of the assembly and contacting the mounting pad 314) a first pressure plate 610, an optional series disk spring 612, a second pressure plate 614, a second insulator 616, and a third pressure plate 618. In one embodiment, an edge of first pressure plate 601 is extended out from the pressure assembly as shown. As will be explained below, this provides a bonding position for a heater wire or lead. Series disk spring 612 is of a commercially available type such as SPRINGMASTERS #D63203 and is selected to have relatively low stiffness but high (>>5 KHz) intrinsic resonant frequency. A series of two springs, a different number of springs, or no springs at all may be used, depending upon application requirements. First and second pressure plates 610 and 614 provide robust surfaces for series disk spring 612 to press against. Second insulator 616 provides for electrical insulation of the MEMS scanner 302. First and second insulators 606, 616 are formed from a material with appropriate density, electrical insulating ability, and compressive strength such as PYREX glass. First and second pressure plates 610, 614 are formed from materials that are suitably electrically conductive and have appropriate physical properties including compressive strength, toughness, and density, such as steel. Third pressure plate 618 provides a mounting surface for second insulator 616 and connects the assembly to a housing (not shown). Third pressure plate 618, preferably formed from steel, includes a bore 620 for receiving a mounting and adjustment screw (not shown). As may be appreciated by those skilled in the art, alternative or modified clamps may be used.

Figure 7:
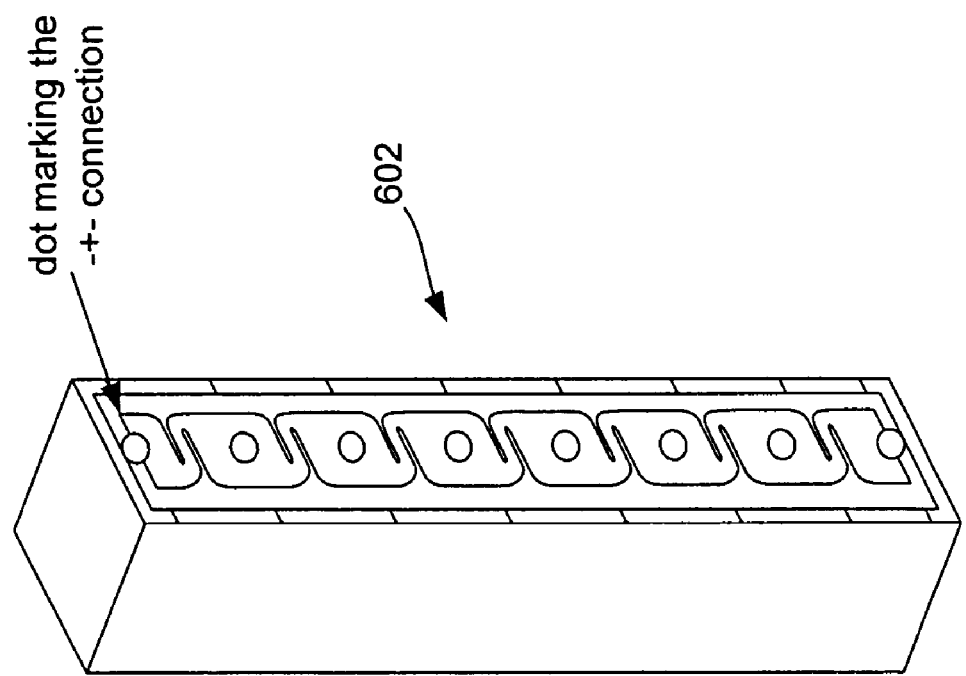
FIG. 7 is a detailed view of a piezo-electric stack used to form the actuator of FIG. 6.

FIG. 7 is a view of a piezo stack actuator 602. Such actuators are available from several sources including http://www.physikinstrumente.de model PICMA 885.10.

Figure 8:
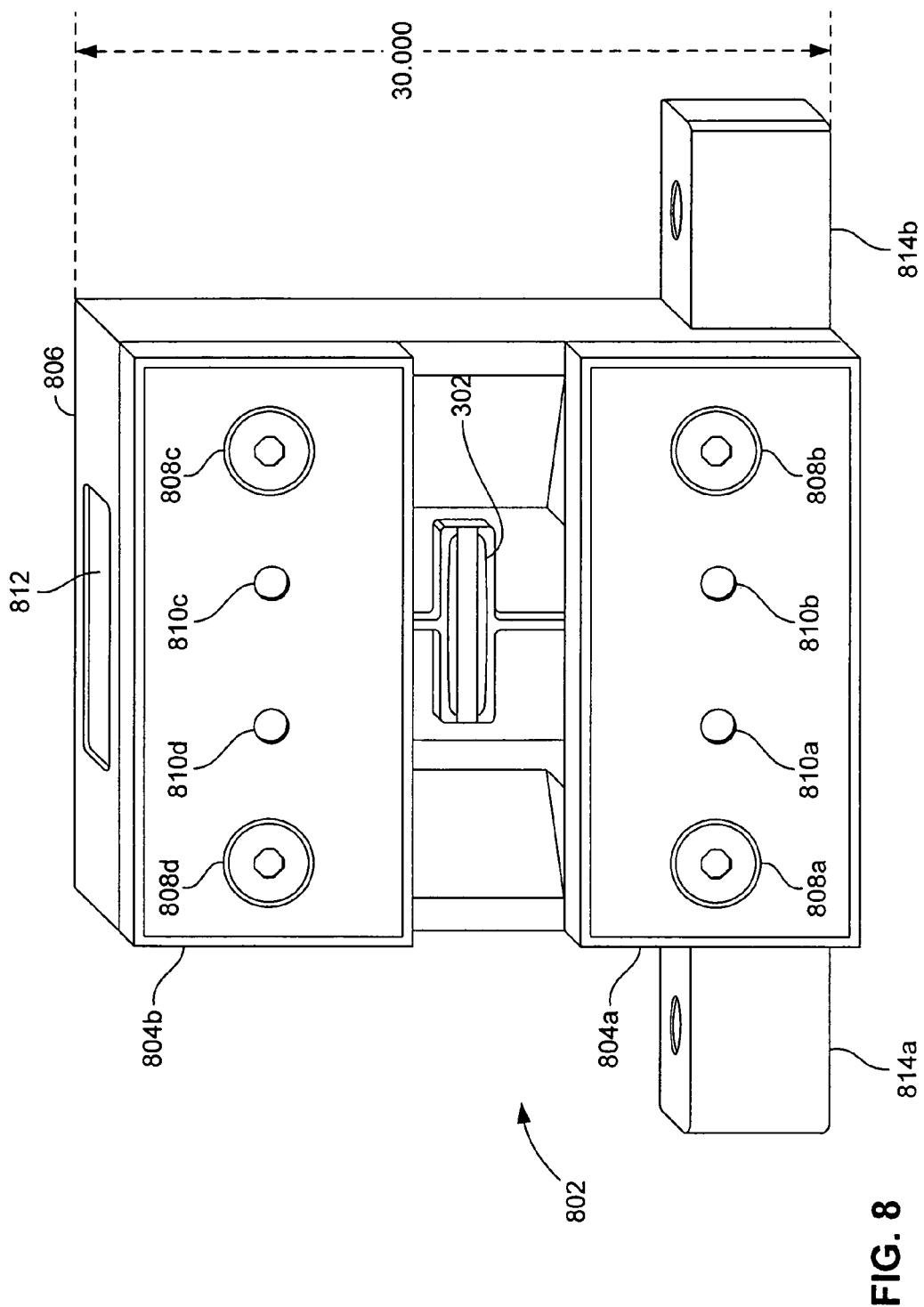
FIG. 8 is a front perspective view of a MEMS scanner package for use in a LBP.
Figure 9:
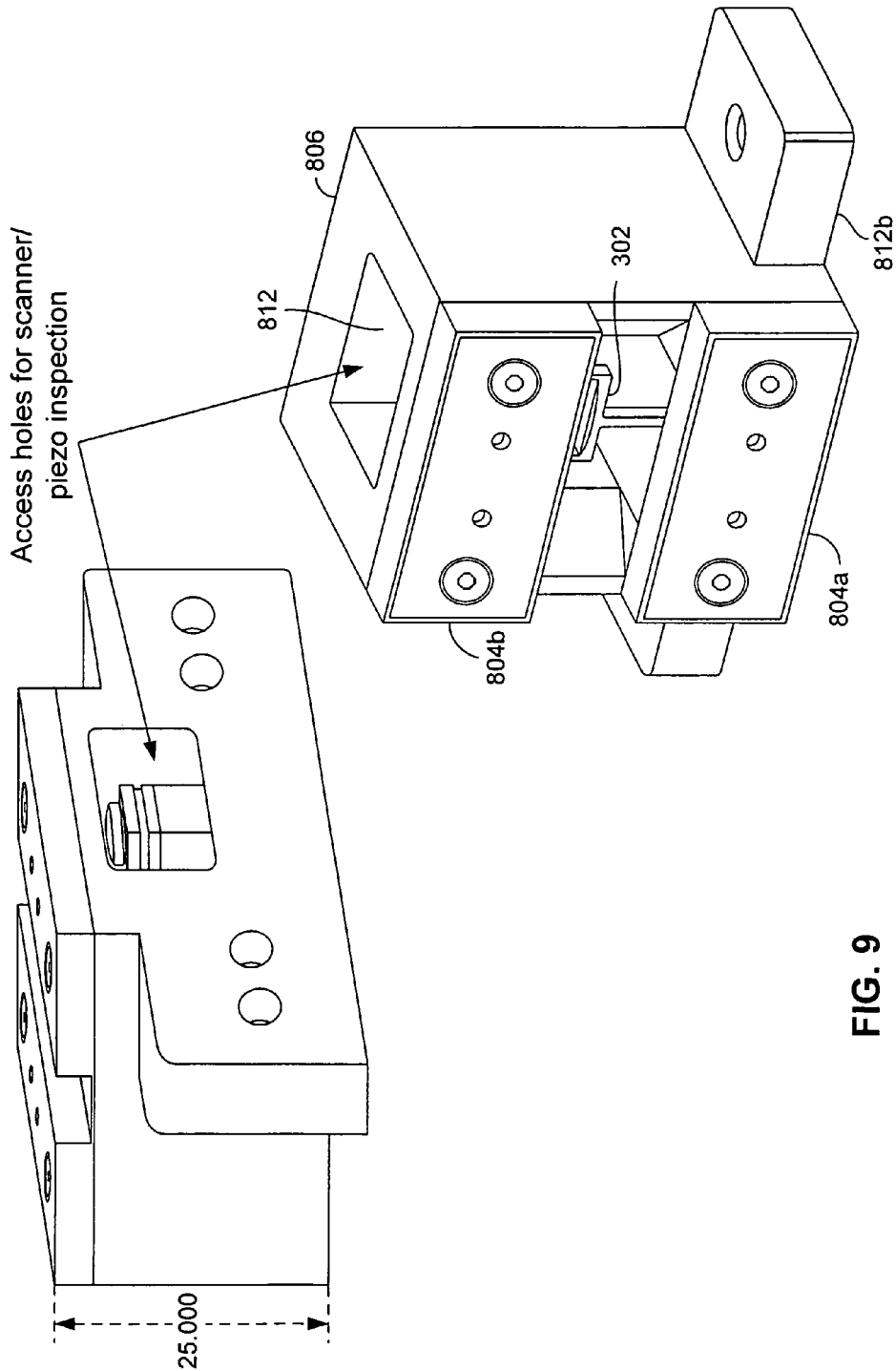
FIG. 9 includes two additional perspective views of the MEMS scanner package of FIG. 8.

FIGS. 8 and 9 are views of a MEMS scanner housing 802 for use in a LBP. Two front plates 804a, 804b are fastened to a rear housing 806 with mounting screws 808a, 808b, 808c, 808d. MEMS scanner 302 is held in a cavity therein that allows for an appropriate amount of rotation. Threaded adjustment screw holes 810a, 810b, 810c, and 810d receive adjustment screws (not shown) that protrude into corresponding adjustment screw receiving bores 620 formed in third pressure plates 618 (shown in FIG. 6). During assembly, adjustment screws are turned to provide an appropriate amount of preload on series disk spring 612 (not shown). Behavior of the MEMS scanner under actuation can be observed through MEMS observation port 812, formed in the top of rear housing 806. The MEMS scanner assembly 802 is secured to the exposure unit of a LBP via mounting tabs 814a, 814b formed in housing 806.

The use of clamps 608 to secure the MEMS scanner 302 in housing 802 results in a mount that "floats", allowing the mounting pads 314 to move a bit with respect to one another.

In some embodiments, slight twisting of the clamps 608 during assembly can result in slight in-plane twisting of the mounting pads 314. This can result in undesirable residual stress in the T-bars and/or torsion bars of the MEMS scanner. Such twisting may be reduced or eliminated by running or "burning-in" the mounted scanner for a few hours at reduced scan angle. In an exemplary embodiment, the scanner is run at half amplitude for approximately four hours. The burn-in process can reduce the occurrence of "infant" failures associated with mechanical failure of the T-bars and/or torsion arms. Alternative, reduced twist clamp assembly designs may be substituted to reduce or eliminate the need for scanner assembly burn-in.

The MEMS scanner 302 may be driven by four piezo-electric stacks 602, one juxtaposed against each mounting pad 314*a*, 314*b*, 314*c*, and 314*d*. Alternatively, one end of the MEMS scanner may be held in a fixed position, i.e. mounting pads 314*c* and 314*d* may be clamped against a solid mounting point, and the other end of the MEMS scanner may be driven by piezo-electric actuators, i.e. mounting pads 314*a* and 314*b* may each be clamped against piezo-electric stacks as shown in FIG. 6. In a third alternative, three of the mounting pads are each clamped to a fixed, solid mounting point and one piezo-electric stack actuator is used. Typically, the choice hinges on cost vs. actuator power requirements.

As indicated above, the MEMS scanner is trimmed to have a resonant frequency within a few hertz of the desired operational frequency. As may be appreciated from curve 402 of FIG. 4, small changes in resonant frequency can result in relatively substantial changes in rotation amplitude (for a given periodic actuation voltage). The inventors have discovered that controlled heating of the MEMS device further trims the resonance frequency, and hence the actuation amplitude, even though in the exemplary embodiment the MEMS scanner has no outer frame. Referring back to FIG. 6, the extended tab on the first pressure plate 610 of clamp 608*a* receives a heater wire as does the corresponding pressure plate of clamp 608*b* (not shown). Similarly, corresponding pressure plates adjacent mounting pads 314*c* and 314*d* (also not shown) also receive heater wires. The heater wires may be attached by soldering to the gold plated extended tab of first pressure plates 610, by soldering to metallized bond pad formed, for example on the mounting pads 314, or by other method as will be apparent to those skilled in the art. In use, the scan amplitude is monitored by sensors and the electric potential between the two ends of scanner 302 (mounting pads 606*a* and 606*b* forming one such end and mounting pads 606*c* and 606*d* forming the other end) is adjusted. Resistance of the silicon material to current flow, and particularly the torsion arms 306*a*, 306*b*, causes joule heating. Higher temperatures cause a "softening" of the torsion arms and a corresponding reduction in resonant frequency. Thus, when the device is operated just below its nominal resonant frequency, heating may be increased to reduce the scan amplitude or heating may be reduced to increase the scan amplitude. It has been experimentally determined that 0 to 1.5 W of tuning power can provide a resonant frequency tuning range of about 8 Hz. This range may be somewhat lower at higher scanning frequencies and somewhat higher at lower scanning frequencies, presumably as a result of airflow over the scanner providing cooling during operation.

The preceding overview of exemplary embodiments of the invention, brief description of the drawings, and detailed description describe exemplary embodiments of the present invention in a manner intended to foster ease of understanding by the reader. Other structures, methods, and equivalents may be within the scope of the invention. As such, the scope of the invention described herein shall be limited only by the claims.

What is claimed is:

1. A MEMS scanner for a laser printer; comprising:
   a silicon scan plate having a lateral dimension greater than about 4 times its longitudinal dimension;
   first and second opposed torsion arms, each torsion arm coupled to the scan plate and extending longitudinally from a proximal to a distal point, the first and second torsion arms defining an axis of rotation of the scan plate;
   first and second opposed mounting structures, each mounting structure coupled to a distal point of a respective torsion arm; and
   first and second suspensions interposed between the scan plate and respective first and second torsion arms, the first and second suspensions forming a torque spreading apparatus operative to maintain dynamic flatness of the mirror during operation of the MEMS scanner, wherein the first and second suspensions include respective first and second suspension beams and the first and second suspension beams are coupled to the silicon scan plate by respective center connectors and first and second lateral connectors.

2. The MEMS scanner for a laser printer of claim 1; wherein the silicon scan plate has a lateral dimension greater than about 8 times its longitudinal dimension.

3. The MEMS scanner for a laser printer of claim 2; wherein the silicon scan plate has a lateral dimension of about 8 millimeters and a longitudinal dimension of about 750 microns.

4. The MEMS scanner for a laser printer of claim 1; wherein the silicon scan plate and first and second opposed torsion arms are about 700 micrometers thick.

5. The MEMS scanner for a laser printer of claim 1; wherein the first and second opposed torsion arms each has a length greater than about 8 millimeters.

6. The MEMS scanner for a laser printer of claim 5; wherein the first and second opposed torsion arms each has a length of about 8.76 millimeters.

7. The MEMS scanner for a laser printer of claim 1; wherein the first and second opposed torsion arms each has a width of about 384 micrometers.

8. The MEMS scanner for a laser printer of claim 1; wherein the first and second opposed torsion arms each has a thickness greater its width.

9. The MEMS scanner for a laser printer of claim 1; wherein the longitudinal dimension of the scan plate is greater than half its thickness and smaller than twice its thickness.

10. The MEMS scanner for a laser printer of claim 1; wherein the first and second opposed mounting structures further include:
    first and second opposed T-bars, each T-bar coupled to a distal point of a respective torsion arm and extending laterally in opposing directions from an axial to two equidistant lateral points therefrom; and
    first, second, third, and fourth mounting pads, each mounting pad coupled to a respective equidistant lateral point of a T-bar.

11. The MEMS scanner for a laser printer of claim 10; wherein the first torsion bar is coupled to the first T-bar with first and second elliptical fillets at the point of coupling.

12. The MEMS scanner for a laser printer of claim 11; wherein the first and second elliptical fillets have a dimension of about 400 micrometers along the torsion arm and about 200 micrometers along the T-bar.

13. The MEMS scanner for a laser printer of claim 10; wherein the equidistant lateral points of the T-bars are offset toward the silicon scan plate in a longitudinal direction compared to the distal point of the torsion arms.

14. The MEMS scanner for a laser printer of claim 10; further comprising at least one stacked piezo-electric actuator aligned vertically with at least one mounting pad.

15. The MEMS scanner for a laser printer of claim 14; wherein the at least one stacked piezo-electric actuator includes two stacked piezo-electric actuators, each vertically aligned with a respective mounting pad.

16. The MEMS scanner for a laser printer of claim 14; wherein the at least one stacked piezo-electric actuator includes four stacked piezo-electric actuators, each vertically aligned with a respective mounting pad.

17. The MEMS scanner for a laser printer of claim 10; further comprising:
a housing to which the first, second, third, and fourth mounting pads are clamped.

18. The MEMS scanner of claim 17; wherein:
the third and fourth mounting pads are clamped directly to the housing;
the first and second mounting pads are clamped to respective first and second stacked piezo-electric actuators; and
the first and second stacked piezo-electric actuators are held in contact with the housing.

19. The MEMS scanner of claim 17; wherein the first, second, third, and fourth mounting pads are clamped to respective first, second, third, and fourth stacked piezo-electric actuators; and
the first, second, third, and fourth piezo-electric actuators are held in contact with the housing.

20. The MEMS scanner of claim 19; wherein the first, second, third and fourth mounting pads are clamped to the respective first, second, third, and fourth stacked piezo-electric actuators so as to provide a pre-loaded compressive force on the respective stacked piezo-electric actuators.

21. The MEMS scanner for a laser printer of claim 17; further comprising a laser printer exposure unit to which the housing is mounted.

22. The MEMS scanner for a laser printer of claim 1; wherein the scan plate is operable to periodically rotate back-and-forth around the axis of rotation defined by the first and second torsion arms at a frequency greater than about 1 KHz.

23. The MEMS scanner for a laser printer of claim 22; wherein the scan plate is operable to periodically rotate back-and-forth around the axis of rotation defined by the first and second torsion arms at a frequency of about 5 KHz.

24. The MEMS scanner for a laser printer of claim 1; wherein the scan plate is operable to periodically rotate back-and-forth around the axis of rotation defined by the first and second torsion arms to a rotational displacement greater than about 10 degrees mechanical zero-to-peak scan angle.

25. The MEMS scanner for a laser printer of claim 24; wherein the scan plate is operable to periodically rotate back-and-forth around the axis of rotation defined by the first and second torsion arms to a rotational displacement of about 20 degrees mechanical zero-to-peak scan angle.

26. The MEMS scanner for a laser printer of claim 1; wherein the first and second suspension beams each have a longitudinal dimension smaller than the longitudinal dimension of the silicon scan plate.

27. The MEMS scanner for a laser printer of claim 1; wherein the MEMS scanner is photolithographically formed from a silicon wafer.

28. The MEMS scanner for a laser printer of claim 1, wherein the silicon scan plate, the first and second opposed torsion arms, and the first and second opposed mounting structures are formed having a constant thickness corresponding to the thickness of a silicon wafer.

29. The MEMS scanner for a laser printer of claim 1; further comprising:
a mirror formed on a surface of the silicon scan plate.

30. The MEMS scanner for a laser printer of claim 29; wherein the mirror has a reflectivity greater than about 90% at a wavelength of about 650 nanometers.

31. The MEMS scanner for a laser printer of claim 30; wherein the mirror has a reflectivity greater than about 95% at a wavelength of about 650 nanometers.

32. The MEMS scanner for a laser printer of claim 1; further comprising first and second heater leads functionally coupled to the respective first and second opposed mounting structures.

33. The MEMS scanner for a laser printer of claim 32; wherein the first and second heater leads are operable to create an electric potential across the first and second torsion arms.

34. The MEMS scanner for a laser printer of claim 33; wherein the first and second heater leads are operable to induce joule heating within the first and second torsion arms.

35. An electrophotographic printer; comprising:
a photoconductor operable to, in succession, receive a static charge, receive modulated light to form a latent electrostatic image, receive toner in a pattern corresponding to the latent electrostatic image, and transfer the toner to a receiving web; and
an exposure unit operable to provide modulated light to the photoconductor, the exposure unit comprising;
a light source responsive to a modulated signal;
beam shaping optics aligned to receive light from the light source and produce a shaped beam of light; and
a MEMS scanner aligned to receive the shaped beam of light and operable to periodically scan the light across the photoconductor; wherein the MEMS scanner comprises:
a silicon scan plate having a lateral dimension greater than about 4 times its longitudinal dimension;
first and second opposed torsion arms, each torsion arm coupled to the scan plate and extending longitudinally from a proximal to a distal point, the first and second torsion arms defining an axis of rotation of the scan plate;
first and second opposed mounting structures, each mounting structure coupled to a distal point of a respective torsion arm; and
first and second suspensions interposed between the scan plate and respective first and second torsion arms, the first and second suspensions forming a torque spreading apparatus operative to maintain dynamic flatness of the mirror during operation of the MEMS scanner, wherein the first and second suspensions include respective first and second suspension beams and the first and second suspension beams are coupled to the silicon scan plate by respective center connectors and first and second lateral connectors.

36. The electrophotographic printer of claim 35; wherein the MEMS scanner has scan mirror having a length of about 8 millimeters in the first axis and a length of about 750 microns in the second axis.

* * * * *

UNITED STATES PATENT AND TRADEMARK OFFICE
CERTIFICATE OF CORRECTION

PATENT NO. : 7,636,101 B2  
APPLICATION NO. : 11/502131  
DATED : December 22, 2009  
INVENTOR(S) : Randall B. Sprague et al.

It is certified that error appears in the above-identified patent and that said Letters Patent is hereby corrected as shown below:

TITLE PAGE, Item (73)  
Add "Seiko Epson Corporation, Hirooka, (JP)" after "Microvision, Inc., Redmond WA (US)" in the Assignee category.

Signed and Sealed this

Thirtieth Day of March, 2010

David J. Kappos  
*Director of the United States Patent and Trademark Office*